United States Patent
Li

(10) Patent No.: US 11,010,859 B2
(45) Date of Patent: May 18, 2021

(54) DISPLAY RESOURCE SCHEDULING METHOD AND DEVICE FOR EMBEDDED SYSTEM

(71) Applicant: CLOUDMINDS (SHENZHEN) ROBOTICS SYSTEMS CO., LTD., Shenzhen (CN)

(72) Inventor: Yangang Li, Shenzhen (CN)

(73) Assignee: CLOUDMINDS (SHENZHEN) ROBOTICS SYSTEMS CO., LTD., Shenzhen (CN)

(*) Notice: Subject to any disclaimer, the term of this patent is extended or adjusted under 35 U.S.C. 154(b) by 0 days.

(21) Appl. No.: 16/578,332

(22) Filed: Sep. 21, 2019

(65) Prior Publication Data
US 2020/0098081 A1 Mar. 26, 2020

(30) Foreign Application Priority Data
Sep. 21, 2018 (CN) .......................... 201811109990.7

(51) Int. Cl.
*G06T 1/20* (2006.01)
*G06F 9/455* (2018.01)
*G06F 9/50* (2006.01)

(52) U.S. Cl.
CPC ............... *G06T 1/20* (2013.01); *G06F 9/455* (2013.01); *G06F 9/505* (2013.01); *G06F 9/5083* (2013.01)

(58) Field of Classification Search
None
See application file for complete search history.

(56) References Cited

U.S. PATENT DOCUMENTS

2006/0146057 A1* 7/2006 Blythe ................ G06F 9/45537
345/506
2008/0222383 A1* 9/2008 Spracklen ........... G06F 12/1036
711/207
(Continued)

FOREIGN PATENT DOCUMENTS

CN 103309748 A 9/2013
CN 105637886 A 6/2016
(Continued)

OTHER PUBLICATIONS

Extended European Search Report for the counterpart of EP Application No. 19198408.7, dated Feb. 20, 2020, 8 pages total.

*Primary Examiner* — Joni Hsu
(74) *Attorney, Agent, or Firm* — Morgan, Lewis & Bockius LLP

(57) ABSTRACT

The present disclosure relates to a display resource scheduling method and device for an embedded system, a computer readable storage medium and an electronic device. The embodiment of the present disclosure provides a display resource scheduling method for an embedded system, at least a host operating system and a first guest operating system running on the embedded system, and the embedded system including a graphics processing unit and a display-specific hardware accelerator. The method includes: receiving a graphic to be displayed of the first guest operating system; preferentially scheduling the display-specific hardware accelerator to perform a display operation on the graphic to be displayed; if resources of the display-specific hardware accelerator are exhausted, scheduling the graphics processing unit to perform a display operation on the graphic to be displayed.

18 Claims, 11 Drawing Sheets

(56) References Cited

U.S. PATENT DOCUMENTS

| | | | |
|---|---|---|---|
| 2010/0271479 A1* | 10/2010 | Heydlauf | G01N 33/54366 348/143 |
| 2011/0102443 A1 | 5/2011 | Dror et al. | |
| 2014/0184622 A1 | 7/2014 | Xia | |
| 2017/0090966 A1* | 3/2017 | Gupta | G06F 9/45558 |
| 2017/0308988 A1 | 10/2017 | Li et al. | |

FOREIGN PATENT DOCUMENTS

| | | |
|---|---|---|
| CN | 106886974 A | 6/2017 |
| CN | 107003875 A | 8/2017 |

\* cited by examiner

DISPLAY RESOURCE SCHEDULING METHOD AND DEVICE FOR EMBEDDED SYSTEM

CROSS-REFERENCE TO RELATED APPLICATION

This application claims the priority benefit of Chinese Patent Application No. 201811109990.7 filed on Sep. 21, 2018 and entitled "DISPLAY RESOURCE SCHEDULING METHOD AND DEVICE FOR EMBEDDED SYSTEM", the disclosure of which is incorporated by reference herein in its entirety.

TECHNICAL FIELD

The present disclosure relates to the field of electrical communication technologies, and in particular, to a display resource scheduling method for an embedded system, a display resource scheduling device for an embedded system, a computer readable storage medium, and an electronic device.

BACKGROUND

At least one host operating system and at least one guest operating system can be running simultaneously on an embedded system. Sequentially to enable the guest operating system to implement the display function on the embedded system, the implementation method in the related art is as follows.

A native window (which can be abbreviated as NW) is requested in the host operating system. This requested native window is used as an output window of the guest operating system, that is, pixels used by the guest operating system for displaying are all displayed on the native window. If the host operating system provides a graphics processing unit (GPU), the guest operating system simulates a hardware graphics accelerator by emulating a graphics processing unit in an emulator and providing a Graphics Library supporting the graphics processing unit in its user space, to accelerate the speed of the graphics processing in the guest operating system. Or the guest operating system provides a simulated virtual Graphics Library in its user space, and the simulated virtual Graphics Library completes the procedure of the graphic process by invoking the actual Graphics Library in the host operating system. The display pixels of the guest operating system processed by the virtual Graphics Library are finally displayed in this native window that is requested by the guest operating system in the host operating system.

The technical problems existing in the above related technology are:

The guest operating system emulates the graphics processing unit in the emulator or the guest operating system provides a simulated virtual Graphics Library in its user space, wherein the emulated graphics processing unit or the simulated virtual Graphics Library both completes the procedure of the graphic process by invoking the actual Graphics Library in the host operating system. The actual Graphics Library of the host operating system completes the procedure of the graphic process in accordance with the user's programming, based on the graphics processing unit (GPU) in the embedded system With the development of technology, users have been expecting mobile devices or smart terminals (such as smart phones, tablets, etc.) that are lighter, thinner and have longer standby time. However, in the existing embedded system, all the graphic displays and processes of the guest operating system are performed by using the graphics processing unit, which results in the problems of not making full use of the display resources of the embedded system, higher energy consumption of the embedded system and slower graphic process speed, etc.

Therefore, there are still rooms for improvement in the related art.

It should be noted that, the information disclosed in the above Background section is only for better understanding of the background of the present disclosure, and thus may include information that does not constitute the prior art known to those of ordinarily skilled in the art.

SUMMARY

An object of the present disclosure is to provide a display resource scheduling method for an embedded system, a display resource scheduling device for an embedded system, a computer readable storage medium, and an electronic device, so as to, at least to some extent, overcome the technical problems of higher energy consumption and slower processing speed due to the limitation of the related technologies when the guest operating system running in the embedded system performs graphic display.

According to an aspect of the present disclosure, a display resource scheduling method for an embedded system is provided. At least a host operating system and a first guest operating system run on the embedded system, and the embedded system includes a graphics processing unit and a display-specific hardware accelerator. The method includes: receiving graphic to be displayed of the first guest operating system; preferentially scheduling the display-specific hardware accelerator to perform a display operation on the graphic to be displayed; scheduling the graphics processing unit to perform a display operation on the graphic to be displayed if resources of the display-specific hardware accelerator are exhausted.

In an exemplary embodiment of the present disclosure, the method further includes: if the occupied display-specific hardware accelerator is released, scheduling the display operation performed by the graphics processing unit to the released display-specific hardware accelerator.

In an exemplary embodiment of the present disclosure, the method further includes: if a mandatory request for the graphic to be displayed is received, scheduling the graphics processing unit to perform a display operation on the graphic to be displayed.

In an exemplary embodiment of the present disclosure, the method further includes: assigning a first group of native windows to the first guest operating system.

In an exemplary embodiment of the present disclosure, the first group of native windows include (N+1) native windows, N being a positive integer greater than or equal to 1; wherein the assigning the first group of native windows to the first guest operating system includes: if the display-specific hardware accelerator supports displaying of N layers, making a first to N-th native windows of the first group of native windows correspond to the N layers, respectively; making the (N+1)-th native window of the first group of native windows correspond to 1 layer displayed by using the graphics processing unit.

In an exemplary embodiment of the present disclosure, the preferentially scheduling the display-specific hardware accelerator to perform a display operation on the graphic to be displayed includes: if M which denotes the number of layers to be displayed of the graphic to be displayed is smaller than or equal to N, displaying the M layers to be displayed respectively through M native windows of the first group of native windows corresponding to the display-specific hardware accelerator; wherein M is a positive integer greater than or equal to 1.

In an exemplary embodiment of the present disclosure, the scheduling the graphics processing unit to perform the display operation on the graphic to be displayed if the resources of the display-specific hardware accelerator are exhausted includes: if M for denoting the number of layers to be displayed of the graphic to be displayed is larger than N, displaying first to N-th layers to be displayed respectively through N native windows of the first group of native windows corresponding to the display-specific hardware accelerator, and displaying (N+1)-th to M-th layers to be displayed on the (N+1)-th native window of the first group of native windows sequentially.

In an exemplary embodiment of the present disclosure, a second guest operating system further runs on the embedded system; the method further includes: assigning a second group of native windows to the second guest operating system; if the running of the first guest operating system switches from the foreground to the background, the first group of native windows entering a hidden state from a display state; if the running of the second guest operating system switches from the background to the foreground running, the second group of native windows entering a display state from a hidden state.

In an exemplary embodiment of the present disclosure, a render engine corresponding to the first guest operating system is provided in the host operating system, and each layer to be displayed in the graphic to be displayed of the first guest operating system corresponds to each render thread in the render engine; wherein the receiving the graphic to be displayed of the first guest operating system includes: the render engine communicating with an emulator, which supports the running of the first guest operating system, to transfer data to be displayed of each layer to be displayed into the corresponding render thread through the emulator.

According to an aspect of the present disclosure, a display resource scheduling device for an embedded system is provided. At least a host operating system and a first guest operating system run on the embedded system, and the embedded system includes a graphics processing unit and a display-specific hardware accelerator. The device includes: an emulator, configured for receiving graphic to be displayed of the first guest operating system; a graphics processing resource scheduler, configured for preferentially scheduling the display-specific hardware accelerator to perform a display operation on the graphic to be displayed; and scheduling the graphics processing unit to perform a display operation on the graphic to be displayed if resources of the display-specific hardware accelerator are exhausted.

In an exemplary embodiment of the present disclosure, the graphics processing resource scheduler is provided in the render engine in the host operating system corresponding to the first guest operating system.

According to an aspect of the present disclosure, a computer readable storage medium is provided, on which a computer program is stored, the display resource scheduling method for the embedded system according to any of the above embodiments is realized when the computer program is executed by a processor.

According to an aspect of the present disclosure, an electronic device is provided, which includes: a processor; a storage for storing executable instructions by the processor; wherein the processor is configured for performing the display resource scheduling method for the embedded system according to any of the above embodiments via executing the executable instructions.

According to the display resource scheduling method for the embedded system provided by the embodiments of the present disclosure, for the received graphic to be displayed of the first guest operating system, it is provided for preferentially scheduling the display-specific hardware accelerator in the embedded system to perform a display operation on the graphic to be displayed, and further scheduling the graphics processing unit in the embedded system to perform a display operation of the graphic to be displayed if resources of the display-specific hardware accelerator are exhausted. In this way, on the one hand, compared to the related technologies, all display operations of the guest operating system running in the embedded system are processed by the graphics processing unit, which can improve the utilization rate of the display resources of the embedded system; on the other hand, a display-specific hardware accelerator can be used for graphic display process, which can improve the speed of graphics process, and reduce the energy consumption of the display system of the guest operating system, so that the energy utilization rate of the entire embedded system is improved, and the mobile device or the smart terminal using the embedded system has a smoother image or video viewing experience, the mobile device or the smart terminal has a longer standby time, and the degree of heat generation of the body after using the mobile device or the smart terminal for a period of time can be reduced.

It should be understood that the above general description and the following detailed description are merely exemplary and explanatory and are not limiting.

BRIEF DESCRIPTION OF THE DRAWINGS

The drawings herein are incorporated into the specification and constitute a part of the specification, and the embodiments in conformity with the present disclosure are shown and used in conjunction with the specification for explaining the principle of the present disclosure. Obviously, the figures in the following description are only some of the embodiments of the present disclosure. For those of ordinarily skilled in the art, other figures can also be obtained according to these figures without any creative work.

DETAILED DESCRIPTION

Figure 1:
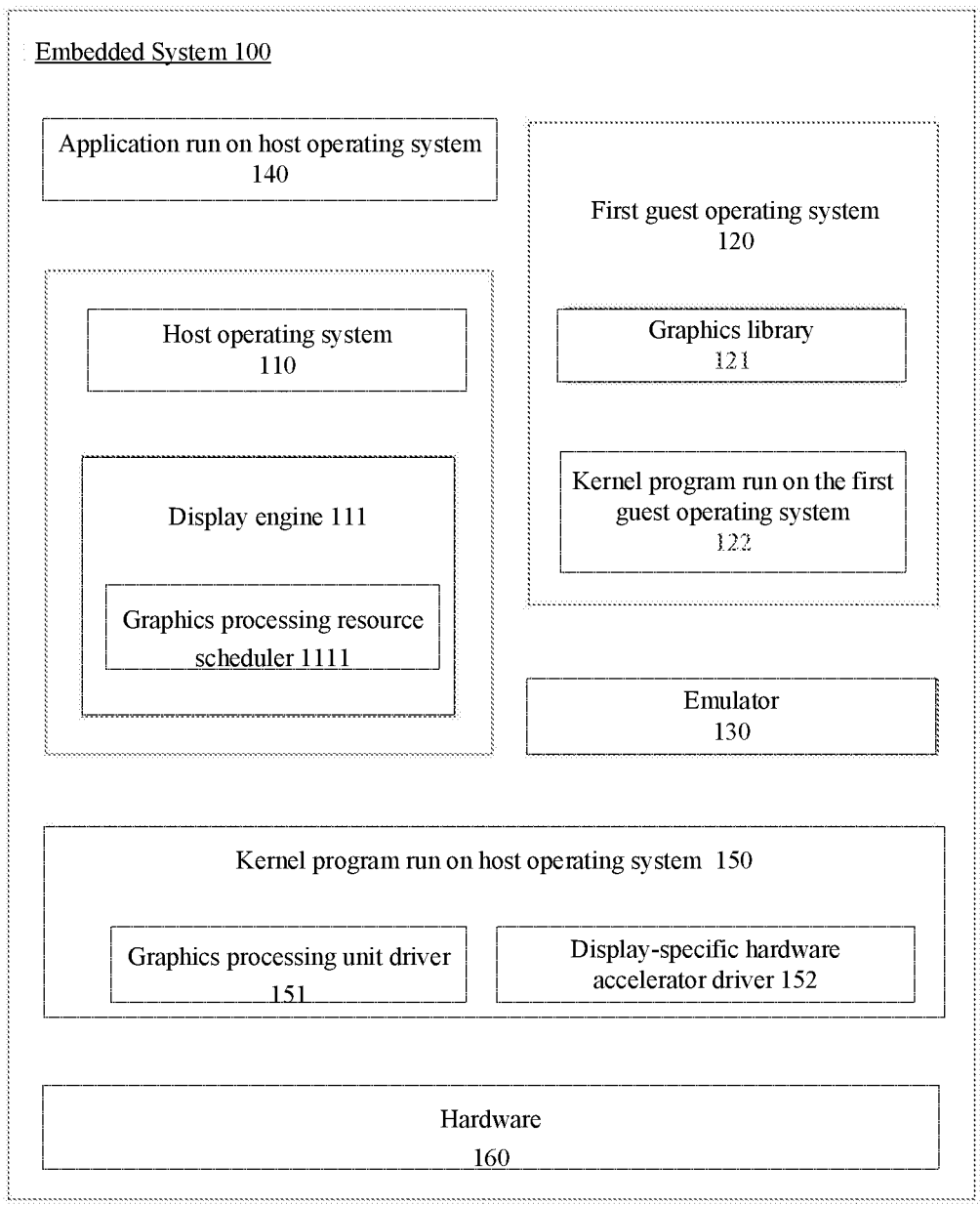
FIG. 1 is a composition block diagram schematically showing an embedded system, according to an exemplary embodiment of the present disclosure.

Exemplary embodiments will now be described more comprehensively with reference to the accompanying drawings. However, the exemplary embodiments can be embodied in a variety of forms and shall not be construed as being limited to the examples set forth herein; rather, these embodiments are provided so that the present disclosure will be more comprehensive and complete, and the idea of the example embodiments will be comprehensively conveyed to those skilled in the art. The described features, structures or characteristics may be combined in one or more embodiments in any suitable manner.

In addition, the drawings are merely schematic representations of the present disclosure and are not necessarily to scale. The same reference signs in the drawings denote the same or similar parts, and the repeated description thereof will be omitted. Some of the block diagrams shown in the drawings are functional entities and do not necessarily have to correspond to physically or logically separated entities. These functional entities can be implemented in software, or can be implemented in one or more hardware modules or integrated circuits, or can be implemented in different networks and/or processor devices and/or microcontroller devices.

FIG. 1 is a composition block diagram schematically showing an embedded system, according to an exemplary embodiment of the present disclosure. A plurality of operating systems are running on the embedded system provided by the embodiment of the present disclosure. The plurality of operating systems at least include one host operating system (HOS) and one guest operating system (GOS). In the embodiment of FIG. 1, one guest operating system, that is, the first guest operating system 120, is taken as an example for illustration. However, the present disclosure is not limited thereto, and the number of the guest operating systems included in the embedded system may be greater than or equal to one.

Wherein the CPU (Central Processing Unit), the Memory, and the Input and Output device, etc. provided by the hardware device (i.e., the hardware 160 in FIG. 1) of the embedded system are shared among the plurality of operating systems.

In the embodiments of the present disclosure, the plurality of operating systems are memory-isolated, and the host operating system cannot access the memory space of the guest operating system, and vice versa. When there are more than three operating systems, and when a certain guest operating system restarts due to an abnormality, the host operating system and other guest operating systems may still operate normally and will not be affected. Whereas, when the host operating system restarts due to an abnormality, all guest operating systems will be restarted together.

As shown in FIG. 1, the embedded system 100 provided by the embodiment of the present disclosure may include a host operating system (HOS) 110, a first guest operating system (Guest OS) 120, an emulator 130, an Application 140 running on the host operating system 110, a Host OS Kernel 150 running by the host operating system 110 and a Hardware 160.

In an embodiment of the present disclosure, when the first guest operating system 120 is running, the emulator 130 simulates hardware devices for being used by the first guest operating system. The emulator 130 is operated as an application of the host operating system 110. The emulator 130 is configured for supporting the operation of the first guest operating system 120 and it is also an application running in the host operating system 110, but with special functions, and thus is listed separately.

In an embodiment of the present disclosure, in addition to a graphics processing unit (GPU), the Hardware 160 inside the embedded system (or processor system) 100 further includes a hardware accelerator dedicated to graphic display (referred to as Display Hardware-Accelerator, that is, display-specific hardware accelerator), such as the Snapdragon Display Engine integrated in the Snapdragon processor, and also the Display-Sub-System integrated in an OMAP (Open Multimedia Application Platform) system processor, etc.

Wherein the host operating system 110 may further include a display engine (Render Engine) 111, and the display engine 111 may further include a graphics processing resource scheduler 1111 therein.

In an embodiment of the present disclosure, in the implementation of the method in the following embodiment, the render engine 111 corresponding to the first guest operating system 120 needs to be provided in the host operating system 110. The render engine 111 includes a unit that can be used to select a manner for performing the display operation, that is, the graphics processing resource scheduler 1111.

In an embodiment of the present disclosure, the graphics processing resource scheduler 1111 may be configured to coordinately scheduling the graphics processing unit and the display-specific hardware accelerator in the embedded system 100. When the host operating system 110 and the plurality of guest operating systems are running on the embedded system 100, any of the guest operating systems can perform displaying through a group of native windows requested in the host operating system 110. For the display device of the embedded system 100, the display device of the embedded system 100 will be used by only one operating system at the same moment. At this moment, if there are no active tasks in other guest operating systems running on the embedded system 100, the respective guest operating systems enter into sleep mode. If there is an active task in a certain one of the other guest operating systems at this moment, this certain one of the other guest operating systems will be in a background state where the user cannot interact with it, as because there is no display device available at this moment.

In an embodiment of the present disclosure, the first guest operating system (Guest OS) 120 may further include a graphics library 121 and a kernel program (Guest OS Kernel) 122 run by the first guest operating system. The first guest operating system 120 performs various graphic displaying operations or processing operations by providing the graphics library 121 to support application software running in the first guest operating system 120.

In an embodiment of the present disclosure, the graphics library 121 refers to a graphics library of a graphics processing unit that is provided by the first guest operating system in its user space for supporting the emulation in the emulator 130, and its function is to facilitate the user to operate the graphics processing unit (GPU) through programming.

In an embodiment of the present disclosure, the kernel program 150 run by the host operating system 110 may further include a graphics processing unit driver 151 and a display-specific hardware accelerator driver 152.

In an embodiment of the present disclosure, the kernel program (Guest OS Kernel) 122 run by the first guest operating system may be configured to provide kernel services such as device driving, memory management and file system support. The kernel program (Host OS Kernel) 150 run by the host operating system 110 has the same function as the kernel program (Guest OS Kernel) 122 run by the first guest operating system.

Compared to the graphics processing unit, these display-specific hardware accelerators for graphical display have a higher speed or lower energy consumption when performing functions such as graphics rendering, image clipping and image rotation. Compared to the display-specific hardware accelerators, the graphics processing unit has the advantage of being programmable and being able to handle graphics processing problems with higher complexity and more variations. In the processing method in the related art, all graphic display and processing are performed by using the graphics processing unit, and resources such as display-specific hardware accelerators for graphic display in an embedded system are discarded, which results in waste of the resources and increase of the energy consumption. For an embedded system, the main energy consumption of the embedded system comes from the display system.

Figure 2:
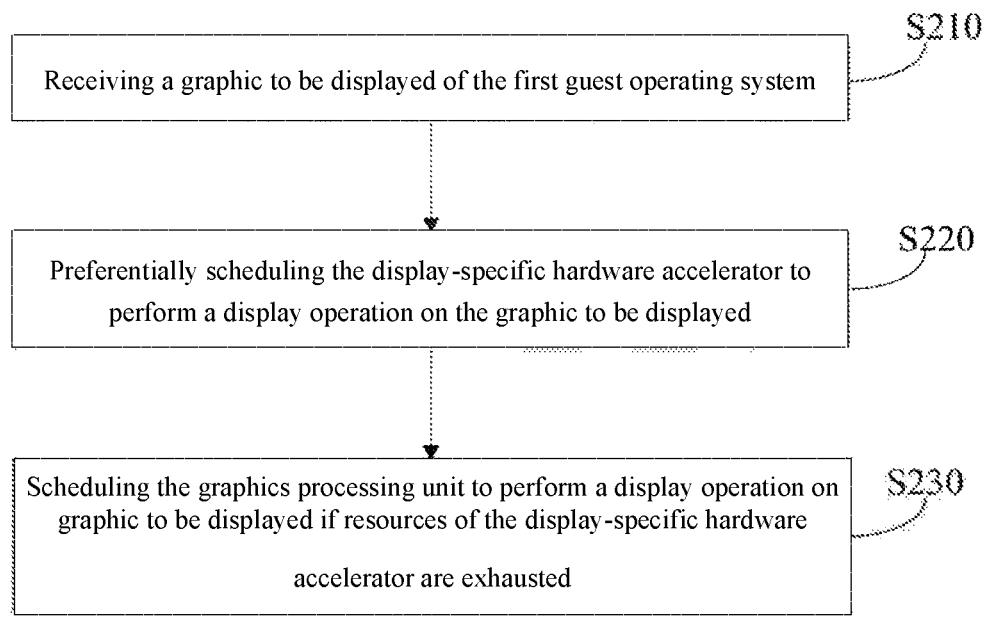
FIG. 2 is a flow chart schematically showing steps in a display resource scheduling method for an embedded system, according to an exemplary embodiment of the present disclosure.

FIG. 2 is a flow chart schematically showing steps in a display resource scheduling method for an embedded system, according to an exemplary embodiment of the present disclosure. At least a host operating system and a first guest operating system run on the embedded system, and the embedded system may include a graphics processing unit and a display-specific hardware accelerator.

As shown in FIG. 2, the display resource scheduling method for the embedded system provided by the embodiment of the present disclosure may further include the following steps.

In a step S210, a graphic to be displayed of the first guest operating system will be received.

In a step S220, the display-specific hardware accelerator will be preferentially scheduled to perform a display operation on the graphic to be displayed.

In an embodiment of the present disclosure, at any moment, only one operating system is displayed in the foreground, which may be the host operating system or a guest operating system. Therefore, the display-specific hardware accelerator can only be used by only one guest operating system at the same moment and cannot be used by a plurality of guest operating systems simultaneously at the same moment. Here, a case in which the first guest operating system is currently in operating state in the foreground will be illustrated.

In a step S230, the graphics processing unit will be scheduled to perform a display operation on the graphic to be displayed if resources of the display-specific hardware accelerator are exhausted.

According to the display resource scheduling method for the embedded system provided by the embodiments of the present disclosure, a graphic to be displayed of the first guest operating system is received, the display-specific hardware accelerator in the embedded system is set to be preferentially scheduled to perform the display operation on the graphic to be displayed, and the graphics processing unit in the embedded system is further scheduled to perform a display operation on the graphic to be displayed if resources of the display-specific hardware accelerator are exhausted. In this way, on the one hand, compared to the prior art in which all display operations of the guest operating systems running in the embedded system are processed by the graphics processing unit, the display resource scheduling method of the present disclosure may improve the utilization rate of the display resources of the embedded system; on the other hand, a display-specific hardware accelerator is be used for graphic display process, which may improve the speed of graphics process, and reduce the energy consumption of the display system of the guest operating system, so that the energy utilization rate of the entire embedded system is improved, and the mobile device or the smart terminal using the embedded system provides a smoother image or video viewing experience; the mobile device or the smart terminal has a longer standby time, and the degree of heat generation of the body after using the mobile device or the smart terminal for a period of time can be reduced.

Figure 3:
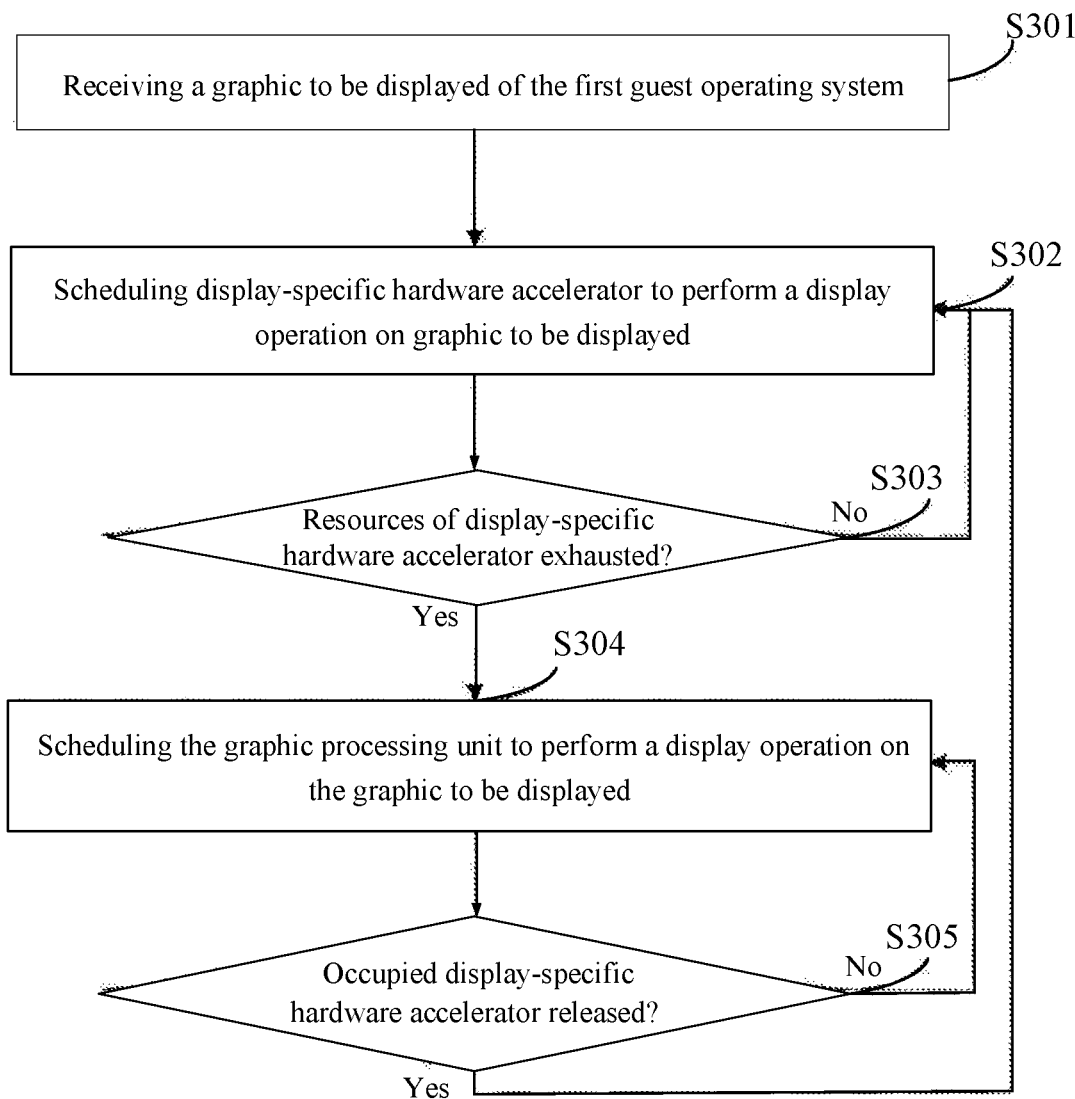
FIG. 3 is a flow chart schematically showing steps in a display resource scheduling method for an embedded system, according to another exemplary embodiment of the present disclosure.

FIG. 3 is a flow chart schematically showing steps in a display resource scheduling method for an embedded system, according to another exemplary embodiment of the present disclosure.

As shown in FIG. 3, the display resource scheduling method for the embedded system provided by the embodiment of the present disclosure may further include the following steps.

In a step S301, a graphic to be displayed of the first guest operating system is received.

In a step S302, the display-specific hardware accelerator is scheduled to perform a display operation on the graphic to be displayed.

In a step S303, it is determined whether resources of the display-specific hardware accelerator are exhausted. If the resources of the display-specific hardware accelerator are exhausted, the method proceeds to a step S304. If the resources of the display-specific hardware accelerator are not exhausted, the method jumps back to the above step S302.

In the step S304, the graphics processing unit is scheduled to perform a display operation on the graphic to be displayed In an embodiment of the present disclosure, the graphics processing unit will be scheduled to perform a display operation on the graphic to be displayed if the resources of the display-specific hardware accelerator are exhausted.

For example, when the number of layers to be displayed of the graphic to be displayed, that need to be displayed and is transferred from the first guest operating system, exceeds the number of layers that the display-specific hardware accelerator can support, the resources of the display-specific hardware accelerator will be exhausted.

In a step S305, it is determined whether the occupied display-specific hardware accelerator has been released; if the occupied display-specific hardware accelerator has been released, then the process jumps back to the above step S302; if the occupied display-specific hardware accelerator is not released, the method jumps back to the above step S305.

In an embodiment of the present disclosure, after the first guest operating system is started, its corresponding render engine in the host operating system is responsible for rendering, cutting and performing other operations on the contents to be displayed by the first guest operating system, that is, the graphic to be displayed. The render engine preferentially uses the display-specific hardware accelerator to perform operations when performing the corresponding display operation; and when the resources of the display-specific hardware accelerator in the embedded system are exhausted, the graphics processing unit will be used to perform corresponding display operation; and after available display-specific hardware accelerator is released in the embedded system, the display operation that is processed using the graphics processing unit is dispatched to the display-specific hardware accelerator. Here, selecting of a manner for performing the display operation may be implemented by the above graphics processing resource scheduler. When the graphics processing resource scheduler selects to perform a certain graphic display operation by using the display-specific hardware accelerator, it will be recorded that the display-specific hardware accelerator is occupied by the display operation. After the display-specific hardware accelerator completes the display operation, the graphics processing resource scheduler clears the record recording that the display-specific hardware accelerator is occupied.

Figure 4:
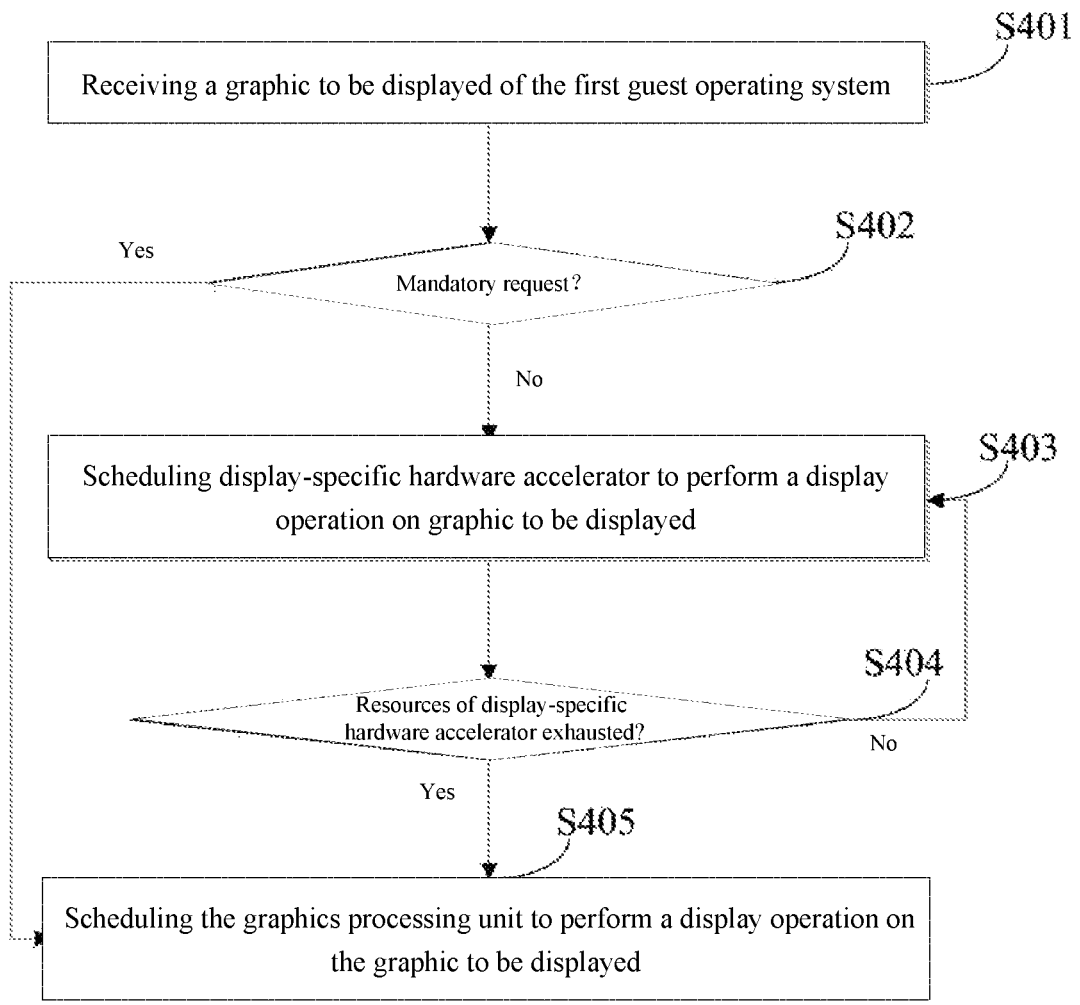
FIG. 4 is a flow chart schematically showing steps in a display resource scheduling method for an embedded system, according to still another exemplary embodiment of the present disclosure.

FIG. 4 is a flow chart schematically showing steps in a display resource scheduling method for an embedded system, according to still another exemplary embodiment of the present disclosure.

As shown in FIG. 4, the display resource scheduling method for the embedded system provided by the embodiment of the present disclosure may further include the following steps.

In a step S401, a graphic to be displayed of the first guest operating system will be received.

In a step S402, it is determined whether a mandatory request for the graphic to be displayed is received. If the mandatory request for the graphic to be displayed is received, the method jumps to a step S405. If the mandatory request for the graphic to be displayed is not received, the method proceeds to a step S403.

In a step S403, the display-specific hardware accelerator will be scheduled to perform a display operation on the graphic to be displayed.

In a step S404, it is determined whether resources of the display-specific hardware accelerator are exhausted. If the resources of the display-specific hardware accelerator are exhausted, the method proceeds to the step S405. If the resources of the display-specific hardware accelerator are not exhausted, the method jumps back to the step S403.

In the step S405, the graphics processing unit will be scheduled to perform a display operation on the graphic to be displayed.

In an embodiment of the present disclosure, in some cases, for example, in the display of 3D (3-dimension) graphics, graphics processing with complexity and more variations is required, thus it is possible to receive a mandatory request issued by the first guest operating system for mandatorily using the graphics processing unit to perform the display operation. In this case, the graphics processing unit may be used to perform a display operation (such as rendering operation) on the graphic to be displayed. However, in the case where the mandatory request by the first guest operating system is not received, the display-specific hardware accelerator can be preferentially scheduled to perform the display operation so that the energy consumption of the embedded system can be reduced and the speed of graphics processing can be improved.

Figure 5:
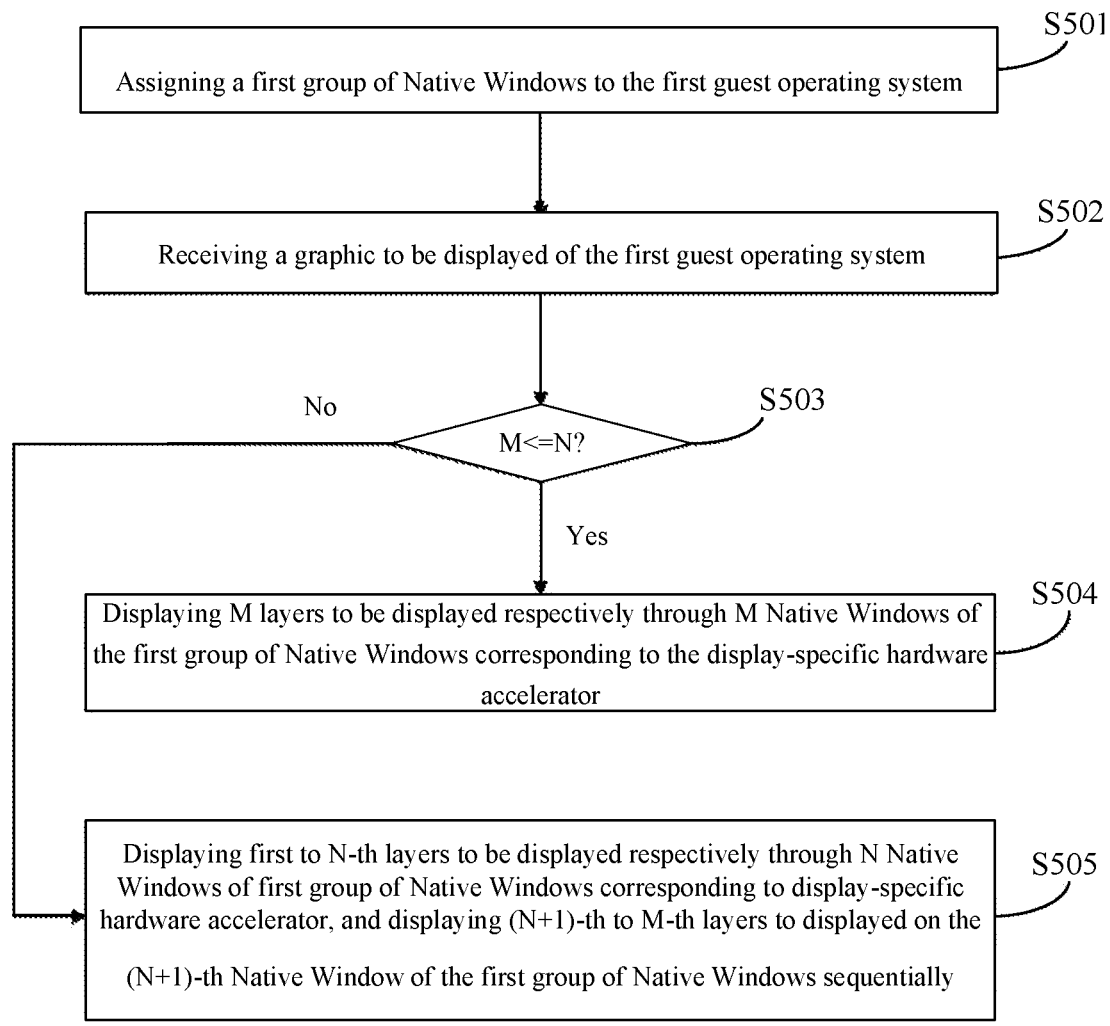
FIG. 5 is a flow chart schematically showing steps in a display resource scheduling method for an embedded system, according to yet another exemplary embodiment of the present disclosure.

FIG. 5 is a flow chart schematically showing steps in a display resource scheduling method for an embedded system, according to yet another exemplary embodiment of the present disclosure.

As shown in FIG. 5, the display resource scheduling method for the embedded system provided by the embodiment of the present disclosure may further include the following steps.

In a step S501, a first group of native windows are assigned to the first guest operating system.

The native windows refer to display windows in the host operating system. This group of display windows are used by the guest operating systems for display.

In an embodiment of the present disclosure, when a plurality of operating systems on the embedded system are started, the host operating system is first started, and after the start of the host operating system is completed, the host operating system assigns a first group of native windows to the first guest operating system, and the first guest operating system is bound to the first group of native windows, and then the first guest operating system begins to start.

Initially, the first guest operating system may be set to run in the background, and the first group of native windows requested by the first guest operating system are set to be in a hidden state at this time. After the start of the first guest operating system is completed, the first guest operating system enters into a sleep mode.

In an embodiment of the present disclosure, the first group of native windows may include (N+1) native windows, N being a positive integer greater than or equal to 1.

The assigning the first group of native windows to the first guest operating system may include: if the display-specific hardware accelerator supports displaying N layers, making a first to N-th native windows of the first group of native windows correspond to the N layers, respectively; making the (N+1)-th native window of the first group of native windows correspond to one layer displayed by using the graphics processing unit In a step S502, a graphic to be displayed of the first guest operating system is be received.

In a step S503, it is determined whether M is smaller than or equal to N; if M is smaller than or equal to N, the method proceeds to a step S504; if M is larger than N, the method jumps to a step S505.

In the step S504, the M layers to be displayed will respectively be displayed through M native windows of the first group of native windows corresponding to the display-specific hardware accelerator.

In an embodiment of the present disclosure, the preferentially scheduling the display-specific hardware accelerator to perform the display operation on the graphic to be displayed may include: if M for denoting the number of layers to be displayed of the graphic to be displayed is smaller than or equal to N, displaying the M layers to be displayed respectively through M native windows of the first group of native windows corresponding to the display-specific hardware accelerator; wherein M is a positive integer greater than or equal to 1.

In the step S505, first to N-th layers to be displayed are respectively displayed through N native windows of the first group of native windows corresponding to the display-specific hardware accelerator, and (N+1)-th to M-th layers to be displayed are displayed on the (N+1)-th native window of the first group of native windows sequentially.

In an embodiment of the present disclosure, the scheduling the graphics processing unit to perform the display operation on the graphic to be displayed if the resources of the display-specific hardware accelerator are exhausted may include: if M for denoting the number of the layers to be displayed is larger than N, displaying first to N-th layers to be displayed respectively through N native windows of the first group of native windows corresponding to the display-specific hardware accelerator, and displaying (N+1)-th to M-th layers to be displayed on the (N+1)-th native window of the first group of native windows sequentially.

Figure 6:
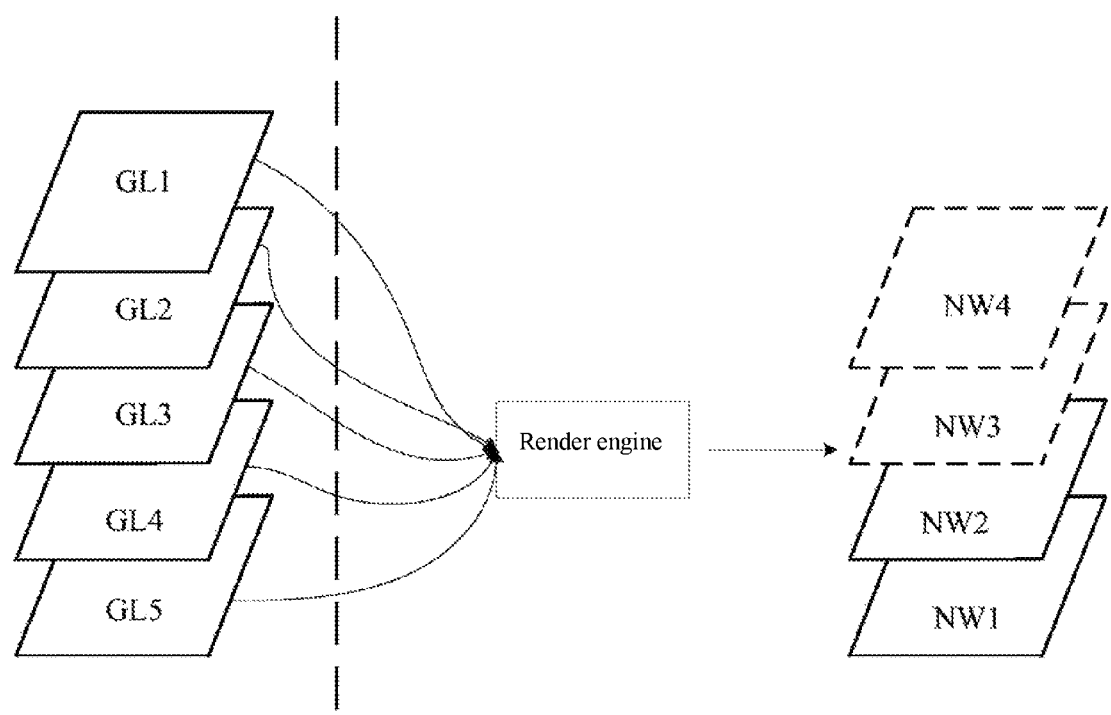
FIG. 6 is a schematic diagram schematically showing a graphic to be displayed that is transferred from the first guest operating system and received by the host operating system, according to an exemplary embodiment of the present disclosure.

FIG. 6 is a schematic diagram schematically showing a graphic to be displayed that is transferred from the first guest operating system and received by the host operating system, according to an exemplary embodiment of the present disclosure.

In an embodiment of the present disclosure, a render engine corresponding to the first guest operating system is provided in the host operating system, and each layer to be displayed in the graphic to be displayed of the first guest operating system corresponds to respective render thread in the render engine; wherein the receiving the graphic to be displayed of the first guest operating system may include: communicating, by the render engine, with an emulator which supports the running of the first guest operating system, to transfer data to be displayed of each layer to be displayed into the corresponding render thread through the emulator.

In the implementation of the method provided by the above embodiments, each guest operating system respectively has a corresponding render engine to serve the guest operating system. For example, the render engine corresponding to the first guest operating system communicates with the emulator supporting the operations of the first guest operating system, and operates according to the operations of the display system of the first guest operating system. Each of the layers to be displayed in the display system of the first guest operating system has a one-to-one correspondence with each of the render threads in the render engine, and data or pixels that need to be drawn for each layer to be displayed can be transferred to the corresponding render thread through the emulator. When the display system of the first guest operating system synthesizes all the layers to be displayed, the render threads in the render engine perform drawing in the order for layer synthesis, select the native windows which are assigned to the first guest operating system but not used, draw display data in the corresponding render threads into the corresponding native windows, and mark the state of the corresponding native windows to be in use. After completing the drawing operations of all the layers to be displayed of the first guest operating system, the display system of the host operating system will be notified to perform the synthesis of the display contents, so as to complete the display of the graphic or content to be displayed of the first guest operating system. When performing rendering or other operations on the graphic to be displayed transferred from the first guest operating system, the display operation can be performed by graphics processing resource scheduler by using the graphics processing unit or the display-specific hardware accelerator.

In an embodiment of the present disclosure, the display system of the first guest operating system is operated independently from the host operating system, and although the final display part depends on the host operating system, the displayed content and the like are independent.

It should be noted that, in the above embodiment, the operation of synthesizing all the layers to be displayed by the display system of the first guest operating system is a different from that of synthesizing the contents to be displayed, which is performed by notifying the display system of the host operating system to perform. The first guest operating system firstly sends a command for layer synthesis, and synthesize the contents to be displayed into a group of native windows in the host operating systems (for example, the first group of native windows); then, the display system in the host operating system synthesizes the displayed contents in the respective native windows in the first group of native windows.

As shown in FIG. 6, it is assumed here that a graphic to be displayed currently received by the first guest operating system has five layers to be displayed (GL1 (guest layer 1) to GL5 (guest layer 5)). The render engine in the host operating system receives the five layers to be displayed and assign them to the unused native windows in the first group of native windows (NW1 (native window 1) to NW4 (native window 4) in FIG. 6) corresponding to the first guest operating system. For example, it is assumed here that NW1 and NW2 (the solid lines indicate that they are in use) are native windows that have been used, and NW3 and NW4 (the dashed lines indicate that they are in an unused state) are native windows that have not yet been used.

In the embodiment shown in FIG. 6, it is assumed that the first guest operating system has five layers to be displayed, and the five layers to be displayed respectively correspond to five render threads in the render engine one by one. The data or pixels of each of the layers to be displayed that needs to be drawn are transferred to the corresponding render thread through the emulator, and the render thread selects an unused native window assigned to the first guest operating system. When the render engine performs rendering or other operations on the graphic to be displayed transferred from the first guest operating system, the graphics processing resource scheduler in the render engine in the host operating system performs the corresponding operations by using the GPU or the display-specific hardware accelerator.

Figure 7:
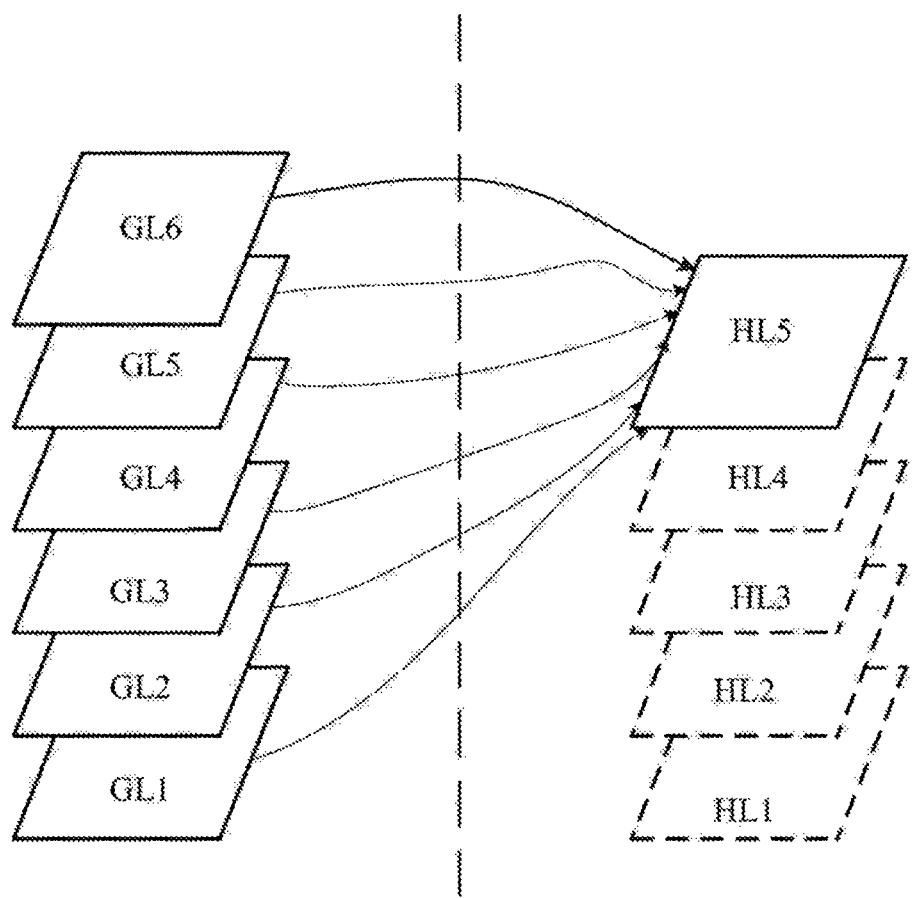
FIG. 7 is a schematic diagram schematically showing a display resource scheduling method for an embedded system when a mandatory request is received, according to an exemplary embodiment of the present disclosure.

FIG. 7 is a schematic diagram schematically showing a display resource scheduling method for an embedded system when a mandatory request is received, according to an exemplary embodiment of the present disclosure.

As shown in FIG. 7, it is assumed here that the graphic to be displayed, which is transferred from the first guest operating system and currently received by the host operating system, has six layers to be displayed (GL1 (guest layer 1) to GL6 (guest layer 6)). The host operating system pre-assigns 5 native windows to the first guest operating system (which correspond to HL1 (host layer 1) to HL5 (host layer 5) in FIG. 7 one by one, respectively), wherein it is assumed that the display-specific hardware accelerator supports displaying of four layers (which correspond to HL1 to HL4 in FIG. 7 one by one, respectively), and HL5 corresponds to the graphics processing unit. Then, when a mandatory request is received, the six layers to be displayed will be displayed in the fifth native window in the first group of native windows sequentially.

In the embodiment shown in FIG. 7, it is assumed that the topmost window in the first group of native windows will be used to sequentially display the respective layers to be displayed of the graphic to be displayed of the first guest operating system, wherein GL1 represents the bottommost layer to be displayed, and GL6 represents the topmost layer to be displayed.

In an embodiment of the present disclosure, in the host operating system, one host layer(HL) corresponds to one host native window (NW).

Figure 8:
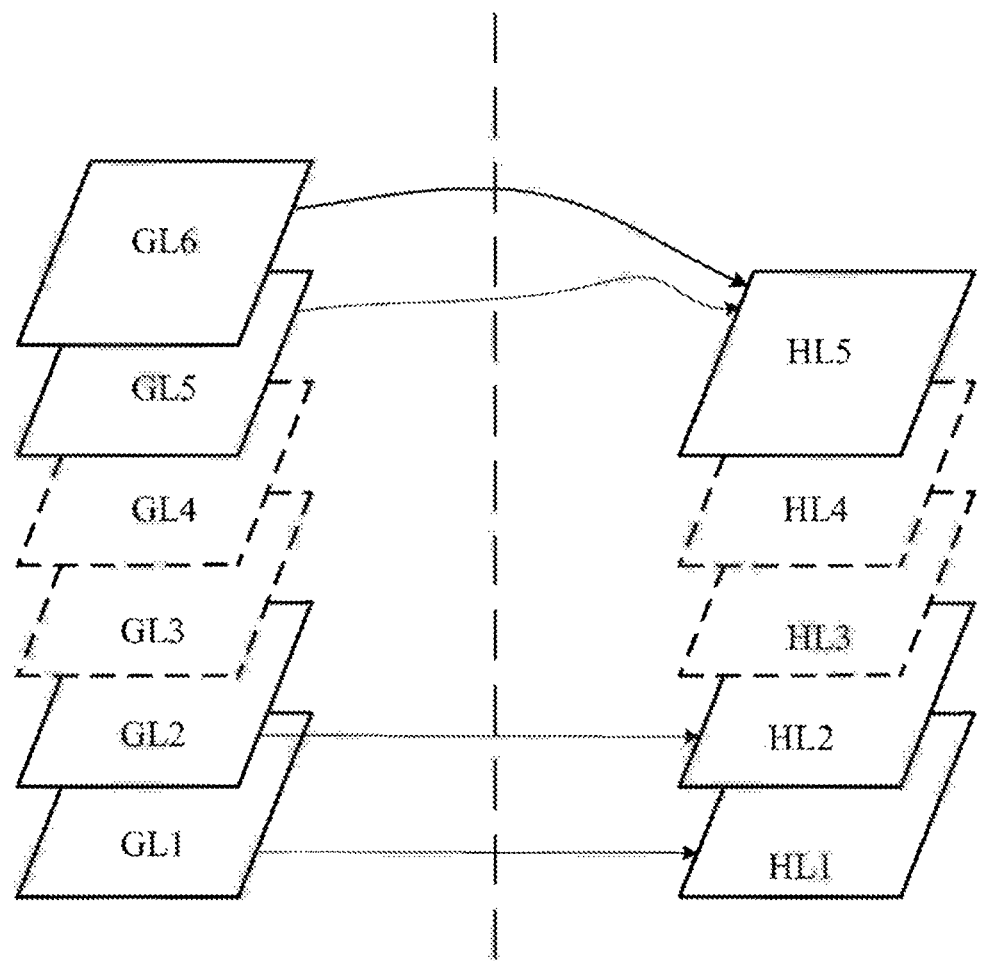
FIG. 8 is a schematic diagram schematically showing a display resource scheduling method for an embedded system when a mandatory request is not received, according to an exemplary embodiment of the present disclosure.

FIG. 8 is a schematic diagram schematically showing a display resource scheduling method for an embedded system when a mandatory request is not received, according to an exemplary embodiment of the present disclosure.

As shown in FIG. 8, it is still assumed here that the graphic to be displayed, which are transferred from the first guest operating system and currently received by the host operating system, has six layers to be displayed (GL1 (guest layer 1) to GL6 (guest layer 6)). The host operating system pre-assigns 5 native windows to the first guest operating system (which correspond to HL1 (host layer 1) to HL5 (host layer 5) in the drawing one by one, respectively), wherein it is assumed that the display-specific hardware accelerator supports displaying of four layers (which correspond to HL1 to HL4 in the drawing one by one, respectively), and HL5 corresponds to the graphics processing unit. Then, when the mandatory request is not received, GL1 and GL2 in the six layers to be displayed will be displayed the first native window and the second native window corresponding to HL1 and HL2, respectively, wherein GL5 and GL6 will be displayed in the fifth native window in the first group of native windows sequentially. Here, the dashed lines indicate that GL3 and GL4 are not displayed, and HL3 and HL4 are not used.

Figure 9:
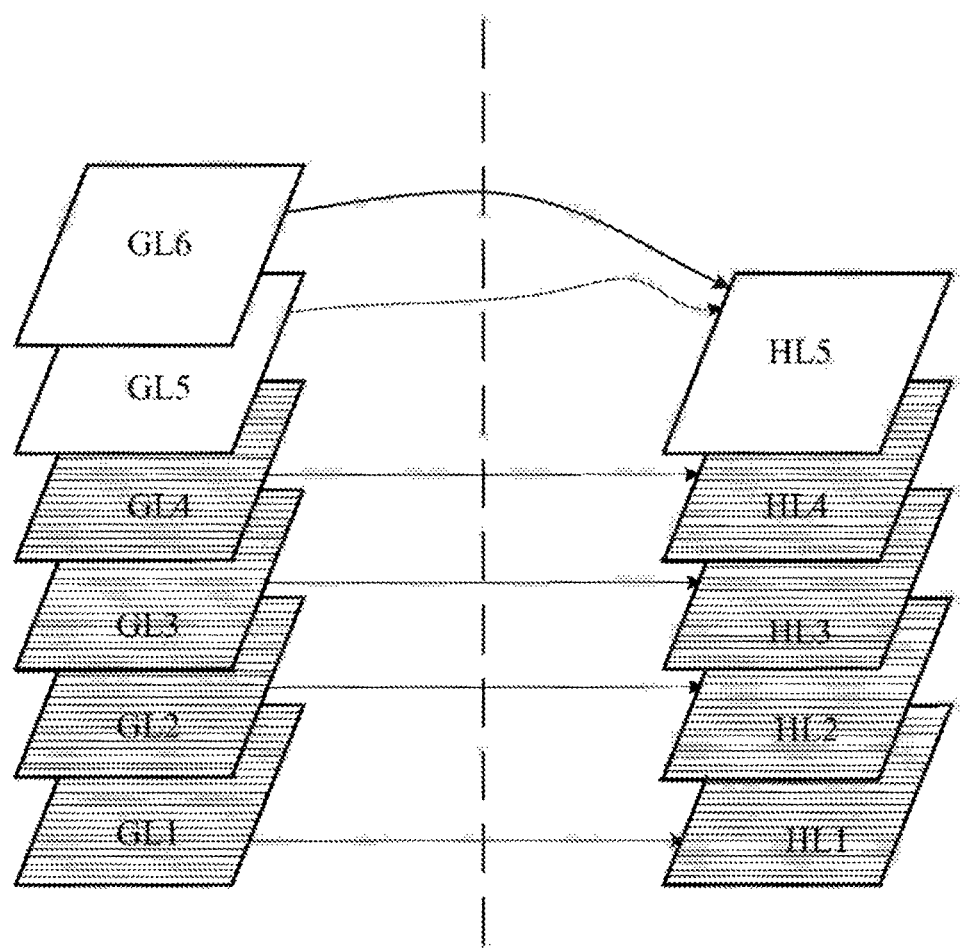
FIG. 9 is a schematic diagram schematically showing a case in which the number of layers to be displayed of the graphic to be displayed received by the first guest operating system is larger than the number of windows of the first group of native windows corresponding thereto, according to an exemplary embodiment of the present disclosure.

FIG. 9 is a schematic diagram schematically showing a case in which the number of layers to be displayed of the graphic to be displayed received by the first guest operating system is larger than the number of windows of the first group of native windows corresponding thereto, according to an exemplary embodiment of the present disclosure.

In the implementation of the method in the above embodiment, the graphics processing resource scheduler assigns the display resources and the native windows for display before performing the resource scheduling: if the display-specific hardware accelerator provided in the embedded system supports rendering of the displayed N layer, the corresponding bottommost N native windows in the first group of native windows assigned to the first guest operating system respectively correspond to these N layers. At the same time, the topmost native window of the first group of native windows assigned to the first guest operating system corresponds to one layer displayed by using graphics processing unit.

As shown in FIG. 9, it is still assumed here that the graphic to be displayed, which are transferred from the first guest operating system and currently received by the host operating system, has six layers to be displayed (GL1 (guest layer 1) to GL6 (guest layer 6)). The host operating system pre-assigns 5 native windows to the first guest operating system (which correspond to HL1 (host layer 1) to HL5 (host layer 5) in the drawing one by one, respectively), wherein it is assumed that the display-specific hardware accelerator supports displaying of four layers (which correspond to HL1 to HL4 in the drawing one by one, respectively), and HL5 corresponds to the graphics processing unit. Then, as M is larger than N, GL1 to GL4 in the six layers to be displayed will be displayed in the first native window to the fourth native window corresponding to HL1 to HL4, respectively, and GL5 and GL6 are displayed in the fifth native window in the first group of native windows sequentially.

In an embodiment of the present disclosure, if M which denotes the number of layers to be displayed of the first guest operating system is greater than N, it indicates that the resource of the display-specific hardware accelerator are exhausted, and at this time the graphics processing unit needs to be used to process the extra layers to be displayed.

In an embodiment of the present disclosure, regardless of the number of the extra layers to be displayed, for example, two extra layers GL5 and GL6 in FIG. 9, the graphics processing unit will be used to sequentially process the extra layers. That is, all the layers to be displayed of the first guest operating system that are rendered by using the GPU may be rendered into the same native window in the first group of native windows of the host operating system.

In an embodiment of the present disclosure, for a particular guest operating system, it is possible to simultaneously use a GPU and a display-specific hardware accelerator to perform rendering operations or other operations on a plurality of layers to be displayed in the graphic to be displayed.

Figure 10:
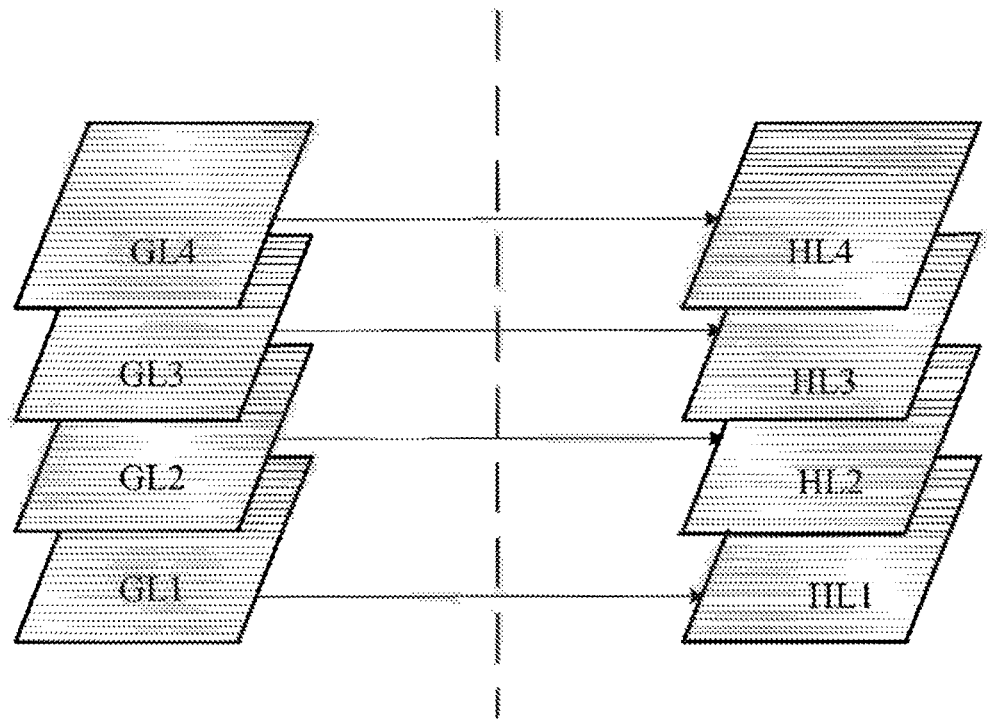
FIG. 10 is a schematic diagram schematically showing a case in which the number of layers to be displayed of the graphic to be displayed received by the first guest operating system is equal to the number of windows of the first group of native windows corresponding thereto, according to an exemplary embodiment of the present disclosure.

FIG. 10 is a schematic diagram schematically showing a case in which the number of layers to be displayed of the graphic to be displayed received by the first guest operating system is equal to the number of windows of the first group of native windows corresponding thereto, according to an exemplary embodiment of the present disclosure.

As shown in FIG. 10, it is assumed here that the graphic to be displayed, which is currently received by the first guest operating system, has four layers to be displayed (GL1 to GL4). The host operating system pre-assigns 4 native windows to the first guest operating system (which correspond to HL1 to HL4 in FIG. 10 one by one, respectively). It is assumed that the display-specific hardware accelerator supports displaying of four layers (which correspond to HL1 to HL4 in FIG. 10 one by one, respectively). Then, as M is equal to N, GL1 to GL4 in the four layers to be displayed will be displayed in the first native window to the fourth native window corresponding to HL1 to HL4, respectively.

Figure 11:
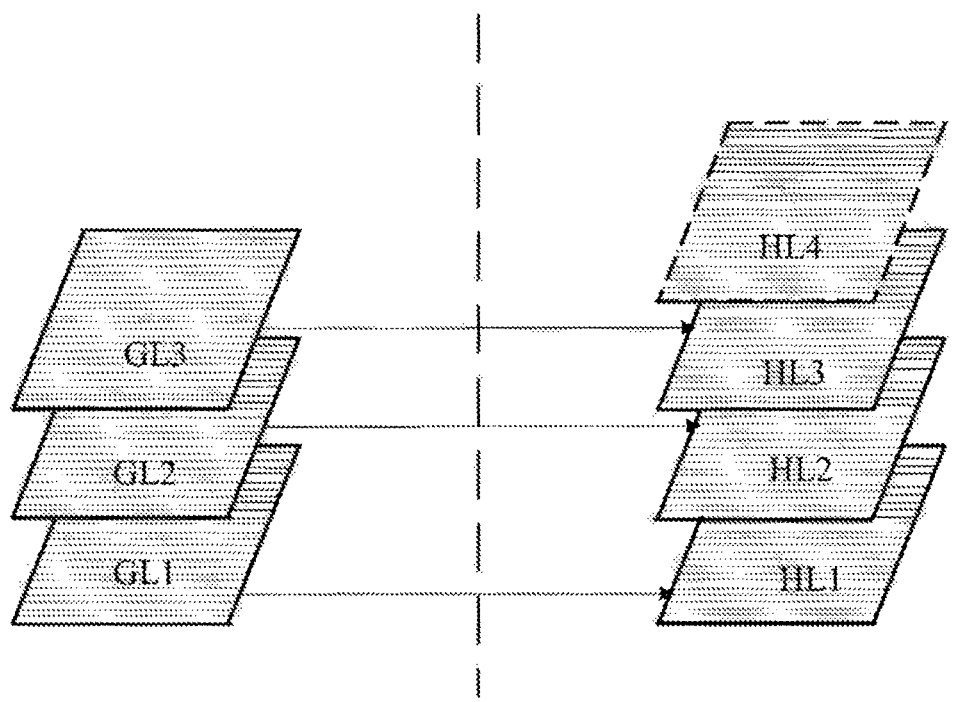
FIG. 11 is a schematic diagram schematically showing a case in which the number of layers to be displayed of the graphic to be displayed received by the first guest operating system is smaller than the number of windows of the first group of native windows corresponding thereto, according to an exemplary embodiment of the present disclosure.

FIG. 11 is a schematic diagram schematically showing a case in which the number of layers to be displayed of the graphic to be displayed received by the first guest operating system is smaller than the number of windows of the first group of native windows corresponding thereto, according to an exemplary embodiment of the present disclosure.

As shown in FIG. 11, it is still assumed here that the graphic to be displayed, which is currently received by the first guest operating system, has three layers to be displayed (GL1 to GL3). The host operating system pre-assigns 4 native windows to the first guest operating system (which correspond to HL1 to HL4 in FIG. 10 one by one, respectively), wherein it is assumed that the display-specific hardware accelerator supports displaying of four layers (which correspond to HL1 to HL4 in FIG. 10 one by one, respectively). Then, as M is smaller than N, GL1 to GL3 in the three layers to be displayed will be displayed the first native window to the third native window corresponding to HL1 to HL3, respectively. The fourth native window HL4 is not occupied.

In the embodiment shown in FIG. 11, M for denoting the number of layers to be displayed of the first guest operating system is smaller than N, which indicates that the resources of the display-specific hardware accelerators are not exhausted, and there may be no need to use the graphics processing unit to process the graphic display of the first guest operating system.

In an embodiment of the present disclosure, the scheduling method specifically executed by the graphics processing resource scheduler may be as follows: when the first guest operating system mandatorily requires all renderings to be performed by using the graphics processing unit (i.e. when the first guest operating system issues a mandatory request to a render engine corresponding to the host operating system), then the graphics processing resource scheduler schedules all the display operations, such as rendering operations, to be performed by using the graphics processing unit, and the display system of the first guest operating system uses the native window (for example, the (N+1)-th native window in the above embodiment), which corresponds to the graphics processing unit, in the first group of native windows assigned to the first guest operating system for displaying; when the first guest operating system does not mandatorily require renderings to be performed by using the graphics processing unit, the graphics processing resource scheduler may schedule rendering operations to be performed by the display-specific hardware accelerators and the rendered results will be displayed through N layers corresponding to the display-specific hardware accelerators; when the number of layers to be displayed of the graphic to be displayed, that currently needs to be displayed, of the first guest operating system exceeds N, the layers to be displayed above N (the (N+1)-th to the M-th layers to be displayed) are drawn into the native window corresponding to the graphics processing unit sequentially through the graphics processing library of the host operating system.

In an embodiment of the present disclosure, when the application in the first guest operating system performs an operation such as graphic display or the like, by using a graphics processing library of the host operating system, the layers to be displayed in the first guest operating system, which are displayed by using the graphics processing library, are drawn into the native window corresponding to the graphics processing unit sequentially through the graphics processing library.

In any of the above embodiments, a second guest operating system may further run on the embedded system.

In an embodiment of the present disclosure, the method may further include: assigning a second group of native windows to the second guest operating system; if the running of the first guest operating system switches from a foreground to a background, the first group of native windows entering a hidden state from a display state; if the running of the second guest operating system switches from the background to the foreground the second group of native windows entering a display state from a hidden state.

In the implementation of the method of any of the above embodiments, each of the plurality of guest operating systems corresponds to a group of native windows. When a guest operating system switches to be running in the background, the group of native windows in the host operating system, which correspond to the guest operating system, enter a hidden state; for another guest operating system, which switches to be running in the foreground, another group of native windows in the host operating system, which correspond to the other guest operating system and are in use, enter a display state. When performing switching between a plurality of guest operating systems, the procedure of the state changes of the respective groups of native windows in the host operating system corresponding to the plurality of guest operating systems, is as shown in FIG. 12.

Figure 12:
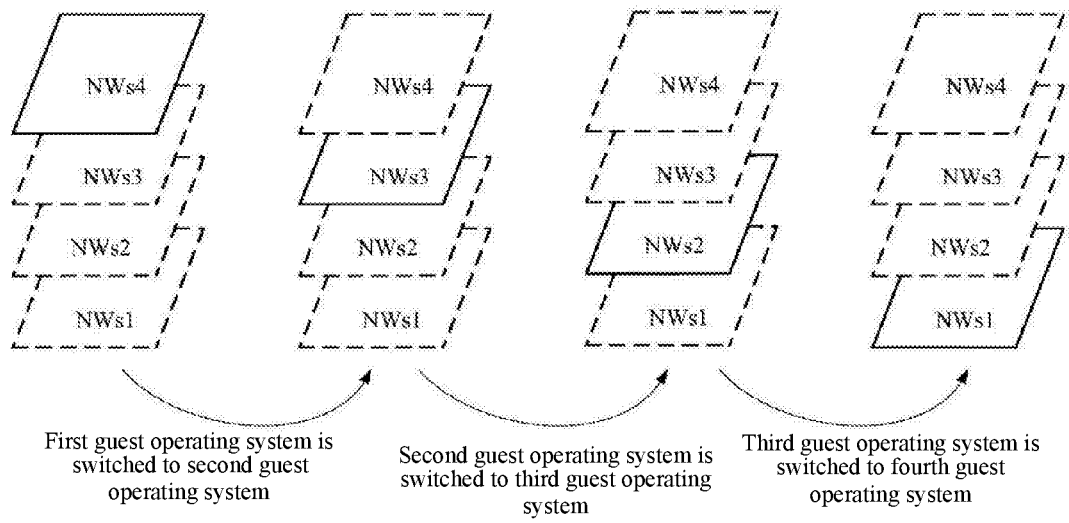
FIG. 12 is a procedure diagram schematically showing state changes of a plurality of groups of native windows corresponding to a plurality of guest operating systems, according to an exemplary embodiment of the present disclosure.

As shown in FIG. 12, it is assumed here that four guest operating systems, i.e., first to fourth guest operating systems, are running on the embedded system. Assuming that the first to fourth guest operating systems are respectively assigned with the first group to the fourth group of native windows (NWs1 to NWs4), when the first guest operating system is switched to the second guest operating system, the first group of native windows enter the hidden state from the display state, and the second group of native windows enter the display state from the hidden state; when the second guest operating system is switched to the third guest operating system, the second group of native windows enter the hidden state from the display state, and the third group of native windows enter the display state from the hidden state; when the third guest operating system is switched to the fourth guest operating system, the third group of native windows enter the hidden state from the display state, and the fourth group of native windows enter the display state from the hidden state.

In an embodiment of the present disclosure, when a certain guest operating system is switched to the background, the group of native windows in the host operating system corresponding to the corresponding guest operating system, enter the hidden state. The corresponding guest operating system, due to being switched to the background, loses the interface for interacting with the user and is switched to the sleep mode. The render engine in the host operating system, which corresponds to the corresponding guest operating system, notifies the graphics processing resource scheduler for scheduling the embedded system and for scheduling the graphics processing resource to release its requested resources of the display-specific hardware accelerators.

Furthermore, an embodiment of the present disclosure also provides a display resource scheduling device for an embedded system. At least a host operating system and a first guest operating system run on the embedded system, and the embedded system includes a graphics processing unit and a display-specific hardware accelerator. The device may include: an emulator, which may be configured for receiving a graphic to be displayed of the first guest operating system; an graphics processing resource scheduler, which may be configured for preferentially scheduling the display-specific hardware accelerator to perform a display operation on the graphic to be displayed; and scheduling the graphics processing unit to perform a display operation on the graphic to be displayed if resources of the display-specific hardware accelerator are exhausted.

In an embodiment of the present disclosure, the graphics processing resource scheduler may be provided in the render engine in the host operating system corresponding to the first guest operating system.

The specific details of the above display resource scheduling device for the embedded system have been described in detail in the corresponding display resource scheduling method for the embedded system, and thus will not repeated herein.

It should be noted that, although the above exemplary embodiments describe the respective steps of the method in the present disclosure in a specific order, this does not require or imply that these steps must be performed in the specific order, or all steps must be performed to achieve the desired results. Additionally or alternatively, certain steps may be omitted, a plurality of steps may be combined into one step for execution, and/or one step may be decomposed into a plurality of steps for executions, and the like.

It should be noted that, although several modules or units of the device for action execution are mentioned in the above detailed description, such division is not mandatory. In fact, according to the embodiments of the present disclosure, the features and functions of two or more modules or units described above can be embodied in one module or unit. Whereas, the features and functions of one of the modules or units described above can be further divided to be embodied by a plurality of modules or units.

In an exemplary embodiment of the present disclosure, a computer readable storage medium is further provided, on which a computer program is stored. The above display resource scheduling method for the embedded system according to the present disclosure can realized when the computer program is executed by a processor. In some possible embodiments, various aspects of the present disclosure may also be implemented in form of a program product, which includes program code; the program product can be stored in a non-volatile storage medium (which may be a CD-ROM, a USB disk or a mobile hard disk or the like) or on a network; when the program product is executed on a computing device (which may be a personal computer, a server, a terminal device, or a network device, etc.), the program code is used to cause the computing device perform the method steps in the above various exemplary embodiments of the present disclosure.

Figure 13:
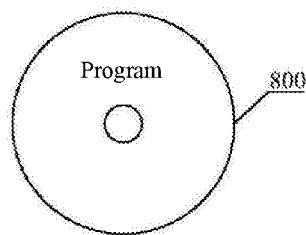
FIG. 13 is a schematic diagram schematically showing a program product according to an exemplary embodiment of the present disclosure.

Referring to FIG. 13, a program product 800 for implementing the above method according to an embodiment of the present disclosure, may employ a portable compact disk read only memory (CD-ROM) and include a program code, and may be executed in a computing device (e.g., a personal computer, a server, a terminal device or a network device, etc.). However, the program product of the present disclosure is not limited thereto. In the present exemplary embodiment, the computer readable storage medium may be any tangible medium that contains or stores a program, which can be used by or in connection with an instruction execution system, apparatus, or device.

The program product may adopt any combination of one or more readable mediums. The readable medium may be a readable signal medium or a readable storage medium.

The readable storage medium may be, for example, but not limited to, an electrical, magnetic, optical, electromagnetic, infrared, or semiconductor system, apparatus, or device, or any combination of the above. More specific examples (non-exhaustive lists) of the readable storage mediums include: electrical connections with one or more wires, portable disks, hard disks, random access memory (RAM), read only memory (ROM), erasable Programmable read-only memory (EPROM or flash memory), optical fiber, portable compact disk read only memory (CD-ROM), optical storage device, magnetic storage device, or any suitable combination of the foregoing.

The readable signal medium may include a data signal that is propagated in the baseband or as part of a carrier, in which a readable program code is carried. Such propagated data signal may adopt a variety of forms, including, but not limited to electromagnetic signals, optical signals, or any suitable combination of the above. The readable signal medium may also be any readable medium other than a readable storage medium, which can send, propagate, or transmit a program for use by or in connection with an instruction execution system, apparatus, or device.

The program code included on the readable medium can be transmitted by using any suitable medium, including, but not limited to wireless, wired, optical cable, RF, etc., or any suitable combination of the above.

Program code for performing the operations of the present disclosure may be written in any combination of one or more programming languages, including object oriented programming languages, such as Java, C++, etc., further including conventional procedural programming languages, such as the C language or a similar programming language. The program code can be executed entirely on the user computing device, partially on the user computing device, as a stand-alone software package, partially on the remote computing device and partially on the user computing device, or entirely on the remote computing device or on the server. In the case where a remote computing device is involved, the remote computing device can be connected to the user computing device via any kind of network, including a local area network (LAN) or a wide area network (WAN), or can be connected to an external computing device, for example via the Internet by using an Internet service provider.

In an exemplary embodiment of the present disclosure, an electronic device is provided. The electronic device includes at least one a processor and at least one storage for storing executable instructions by the processor; wherein the processor is configured for performing the method steps in the above various exemplary embodiments of the present disclosure via executing the executable instructions.

An electronic device 900 in the present exemplary embodiment will be described below with reference to FIG. 14. The electronic device 900 is merely an example and should not impose any limitation on the function and scope of use of the embodiments of the present disclosure.

Figure 14:
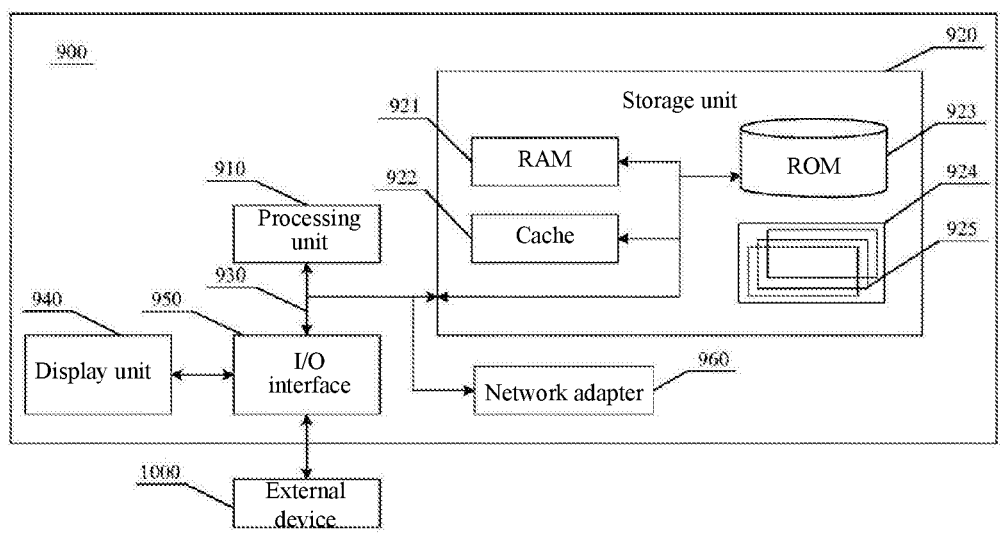
FIG. 14 is a module schematic diagram schematically showing an electronic device according to an exemplary embodiment of the present disclosure.

Referring to FIG. 14, the electronic device 900 is represented in form of a general purpose computing device. The components of the electronic device 900 may include, but not limited to, at least one processing unit 910, at least one storage unit 920, a bus 930 that connects different system components (including the processing unit 910 and the storage unit 920), and a display unit 940.

Wherein in the storage unit 920 a program code is stored, which can be executed by the processing unit 910, such that the processing unit 910 performs the method steps in the above various exemplary embodiments of the present disclosure.

The storage unit 920 may include a readable medium in form of a volatile storage unit, such as a random access storage unit 921 (RAM) and/or a cache storage unit 922, and may further include a read only storage unit 923 (ROM).

The storage unit 920 may also include a program/utility 924 having a set (at least one) of program modules 925, such program modules including but not limited to: an operating system, one or more applications, other program modules, and program data, each of or a certain combination of these examples may include an implementation of a network environment.

The bus 930 may one or more of several types of bus structures, including a storage unit bus or a storage unit controller, a peripheral bus, a graphic acceleration port, a processing unit, or a local bus using any bus structure of the various bus structures.

The electronic device 900 can also communicate with one or more external devices 1000 (such as a keyboard, a pointing device, a Bluetooth device, etc.), and can also communicate with one or more devices that enable the user to interact with the electronic device 900, and/or communicate with any device (e.g., a router, a modem, etc.) that enables the electronic device 900 to communicate with one or more other computing devices. Such communication can take place via an input/output (I/O) interface 950. Also, the electronic device 900 can communicate with one or more networks (e.g., a local area network (LAN), a wide area network (WAN), and/or a public network, such as the Internet) through a network adapter 960. As shown in FIG. 14, the network adapter 960 can communicate with other modules of the electronic device 900 via the bus 930. It should be understood that, although not shown in the drawings, other hardware and/or software modules may be utilized in conjunction with the electronic device 900, including but not limited to: microcode, device drivers, redundant processing units, external disk drive arrays, RAID systems, tape drivers and data backup storage systems, etc.

Those skilled in the art will appreciate that, respective aspects of the present disclosure can be implemented as a system, a method, or a program product. Accordingly, the respective aspects of the present disclosure may be embodied in form of a complete hardware, a complete software implementation (including firmware, microcode, etc.), or an implementation combining hardware and software, which may be collectively referred to herein as "a circuit", "a module" or "a system".

Other embodiments of the present disclosure will readily occur to those skilled in the art after considering the specification and embodying the invention disclosed herein. The present application is intended to cover any variations, uses, or adaptations of the present disclosure, which are in conformity with the general principle of the disclosure and include the common knowledge or the commonly used technical means in the art, that are not disclosed in the present disclosure. The description and embodiments are to be regarded as illustrative only, and the scope and spirit of the present disclosure will be indicated by the appended claims.

The above described features, structures, or characteristics may be combined in one or more embodiments in any suitable manner, and if possible, the features discussed in the various embodiments are interchangeable. In the above description, numerous specific details are set forth to provide a thorough understanding of the embodiments of the disclosure. However, those skilled in the art will recognize that the technical solution of the present disclosure can be practiced without one or more of the specific details, or other methods, components, materials, and the like may be employed. In other cases, well-known structures, materials or operations will not be shown or described in detail to avoid obscuring the aspects of the present disclosure.

What is claimed is:

1. A display resource scheduling method for an embedded system, wherein, at least a host operating system and a first guest operating system run on the embedded system, and the embedded system comprises a graphics processing unit and a display-specific hardware accelerator; the method comprising:
receiving a graphic to be displayed of the first guest operating system;
preferentially scheduling only the display-specific hardware accelerator to perform display operations on the graphic to be displayed; and
scheduling the graphics processing unit to perform the display operations on the graphic to be displayed only if resources of the display-specific hardware accelerator are exhausted.

2. The method according to claim 1, further comprising:
if the display-specific hardware accelerator occupied is released, scheduling the display operations performed by the graphics processing unit to the released display-specific hardware accelerator.

3. The method according to claim 1, further comprising:
if a mandatory request for the graphic to be displayed is received, scheduling the graphics processing unit to perform the display operations on the graphic to be displayed.

4. The method according to claim 1, further comprising:
assigning a first group of native windows to the first guest operating system.

5. The method according to claim 4, wherein, the first group of native windows comprise (N+1) native windows, N being a positive integer greater than or equal to 1; wherein the assigning a first group of native windows to the first guest operating system comprises:
if the display-specific hardware accelerator supports displaying N layers, making first to N-th native windows of the first group of native windows correspond to the N layers, respectively; and
making the (N+1)-th native window of the first group of native windows correspond to one layer displayed by using the graphics processing unit.

6. The method according to claim 5, wherein the preferentially scheduling only the display-specific hardware accelerator to perform display operations on the graphic to be displayed comprises:
if M which denotes the number of layers to be displayed of the graphic to be displayed is smaller than or equal to N, displaying M layers to be displayed respectively through M native windows of the first group of native windows corresponding to the display-specific hardware accelerator;
wherein M is a positive integer greater than or equal to 1.

7. The method according to claim 6, wherein the scheduling the graphics processing unit to perform the display operations the graphic to be displayed only if resources of the display-specific hardware accelerator are exhausted comprises:
if M which denotes the number of layers to be displayed is larger than N, displaying first to N-th layers to be displayed respectively through N native windows of the first group of native windows corresponding to the display-specific hardware accelerator, and displaying (N+1)-th to M-th layers to be displayed on the (N+1)-th native window of the first group of native windows sequentially.

8. The method according to claim 4, wherein a second guest operating system further runs on the embedded system; and the method further comprises:
assigning a second group of native windows to the second guest operating system;
if running of the first guest operating system switches from a foreground to a background, the first group of native windows entering a hidden state from a display state; and if running of the second guest operating system switches from the background to the foreground, the second group of native windows entering a display state from a hidden state.

9. The method according to claim 1, wherein a render engine corresponding to the first guest operating system is provided in the host operating system, and each of layers to be displayed in the graphic to be displayed of the first guest operating system corresponds to each of render threads in the render engine; wherein the receiving the graphic to be displayed of the first guest operating system comprises:

communicating, by the render engine, with an emulator which supports running of the first guest operating system, to transfer data to be displayed of each of layers to be displayed into the corresponding render thread through the emulator.

10. A computer readable storage medium having stored thereon a computer program, when being executed by a processor, the computer program implements the display resource scheduling method for the embedded system according to claim 1.

11. An electronic device, comprising:
a processor; and
a memory for storing executable instructions by the processor;
wherein the processor is configured for performing a display resource scheduling method for an embedded system, wherein, at least a host operating system and a first guest operating system run on the embedded system, and the embedded system comprises a graphics processing unit and a display-specific hardware accelerator; the method comprising:
receiving a graphic to be displayed of the first guest operating system;
preferentially scheduling only the display-specific hardware accelerator to perform display operations on the graphic to be displayed;
scheduling the graphics processing unit to perform the graphics processing unit to perform the display operations on the graphic to be displayed only if resources of the display-specific hardware accelerator are exhausted.

12. The electronic device according to claim 11, wherein, the processor is further configured for performing the following steps:
if the display-specific hardware accelerator occupied is released, scheduling the display operations performed by the graphics processing unit to the released display-specific hardware accelerator.

13. The electronic device according to claim 11, wherein, the processor is further configured for performing the following steps:
if a mandatory request for the graphic to be displayed is received, scheduling the graphics processing unit to perform the display operations on the graphic to be displayed.

14. The electronic device according to claim 11, wherein, the processor is further configured for performing the following steps:
assigning a first group of native windows to the first guest operating system.

15. The electronic device according to claim 14, wherein, the first group of native windows comprise (N+1) native windows, N being a positive integer greater than or equal to 1; wherein the assigning a first group of native windows to the first guest operating system comprises:
if the display-specific hardware accelerator supports displaying N layers, making first to N-th native windows of the first group of native windows correspond to the N layers, respectively;
making the (N+1)-th native window of the first group of native windows correspond to one layer displayed by using the graphics processing unit.

16. The electronic device according to claim 15, wherein the preferentially scheduling only the display-specific hardware accelerator to perform display operations on the graphic to be displayed comprises:
if M which denotes the number of layers to be displayed of the graphic to be displayed is smaller than or equal to N, displaying M layers to be displayed respectively through M native windows of the first group of native windows corresponding to the display-specific hardware accelerator;
wherein M is a positive integer greater than or equal to 1.

17. The electronic device according to claim 16, wherein the scheduling the graphics processing unit to perform the display operations the graphic to be displayed only if resources of the display-specific hardware accelerator are exhausted comprises:
if M which denotes the number of layers to be displayed is larger than N, displaying first to N-th layers to be displayed respectively through N native windows of the first group of native windows corresponding to the display-specific hardware accelerator, and displaying (N+1)-th to M-th layers to be displayed on the (N+1)-th native window of the first group of native windows sequentially.

18. The electronic device according to claim 14, wherein a second guest operating system further runs on the embedded system; and the method further comprises:
assigning a second group of native windows to the second guest operating system;
if running of the first guest operating system switches from a foreground to a background, the first group of native windows entering a hidden state from a display state; and
if running of the second guest operating system switches from the background to the foreground, the second group of native windows entering a display state from a hidden state.

* * * * *